Figure 1:
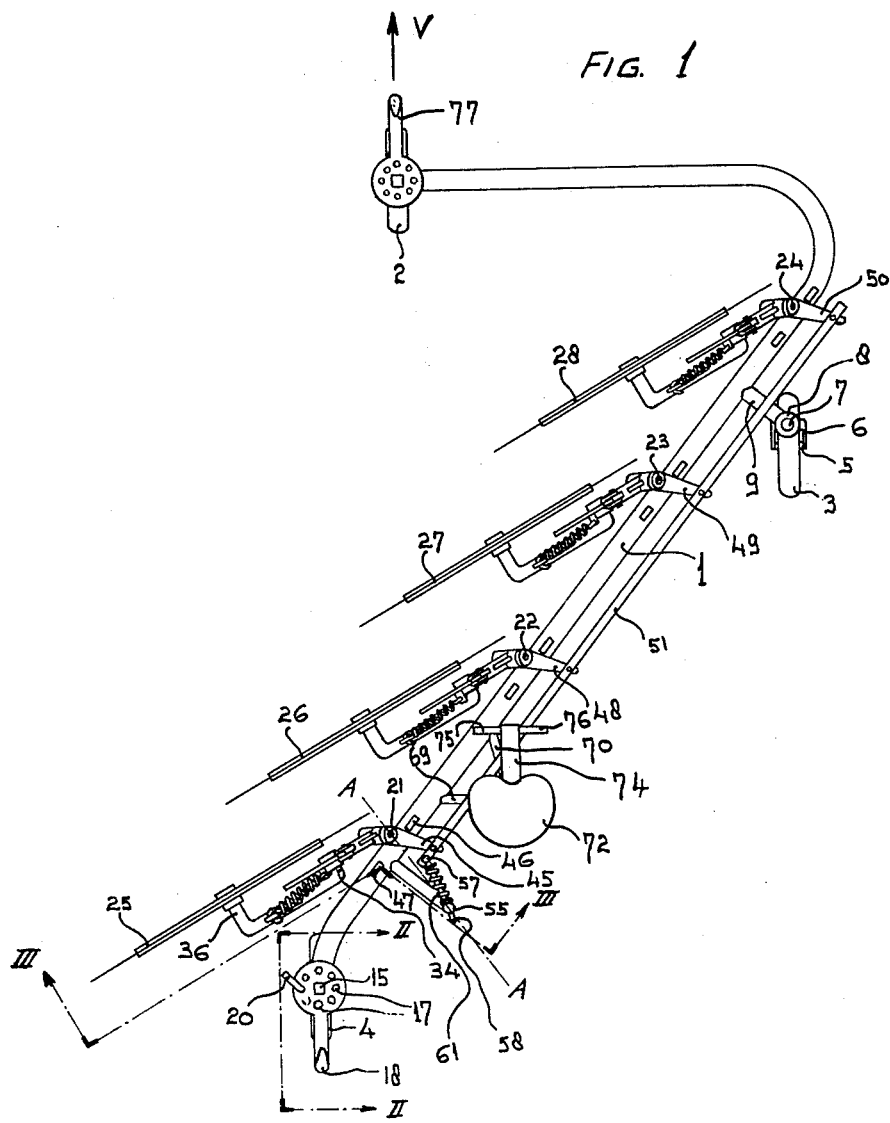

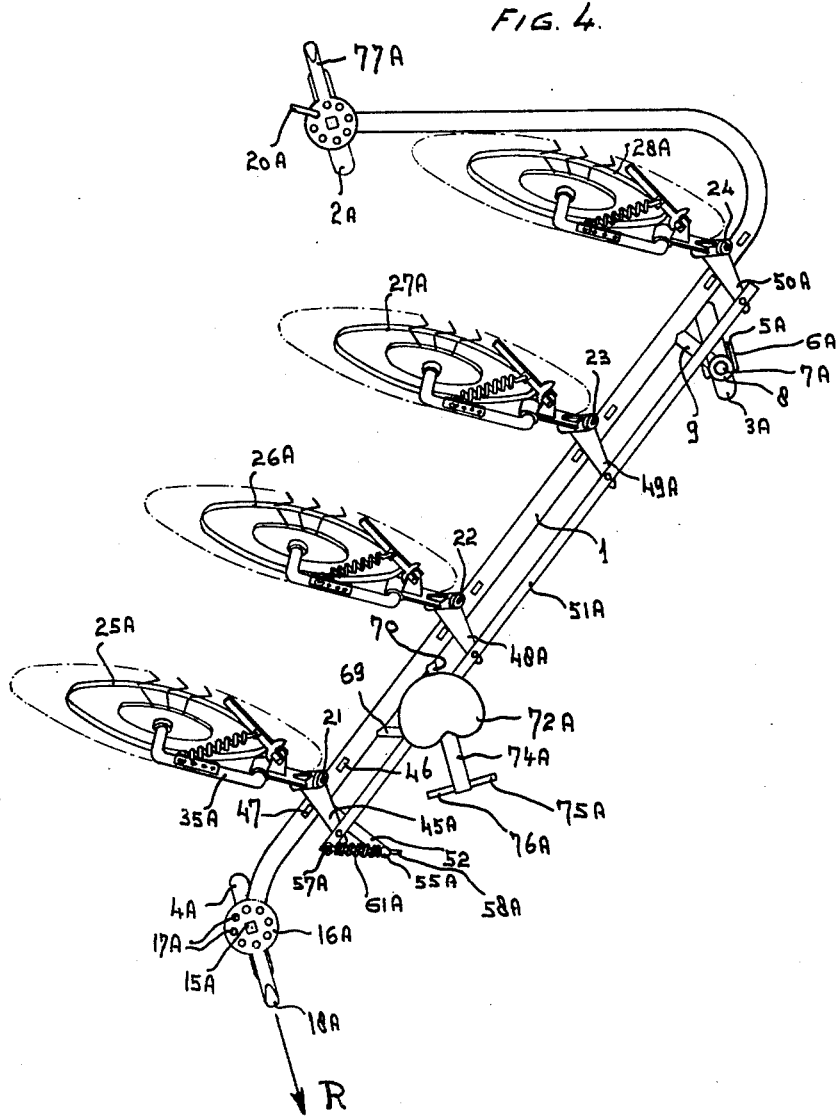

United States Patent Office 3,031,834
Patented May 1, 1962

3,031,834
ROTARY WHEEL RAKING DEVICE
Cornelis van der Lely and Ary van der Lely, Maasland, Netherlands, assignors to C. van der Lely N.V., Maasland, Netherlands, a Dutch limited company
Filed July 13, 1957, Ser. No. 672,828
Claims priority, application Netherlands July 23, 1956
7 Claims. (Cl. 56—365)

This invention relates to devices for laterally displacing crop or the like material lying on the ground.

Known devices of this type employ a plurality of rake wheels and have different working positions. They are adapted, in one working position, to subject crop to an operation different from that in the other working position. Moreover, such devices may be arranged to be moved, in one working position, in a direction which is different from that in the other working position.

It is an object of the invention to provide a simple device of the kind set forth, which can be converted readily from one working position to another working position.

According to the present invention, each rake wheel is mounted for movement about a non-horizontal axis, said axis and the axis of the rake wheel forming a pair of skew-lines, the arangement being such that by turning a rake wheel about its non-horizontal axis, the device can be converted from one working position to another.

With this construction, it is possible to convert the device readily from a first working position into a second working position, since the rake wheels can be readily moved to their new positions. Moreover, it is not necessary to detach the rake wheels and reposition them on the device. Also, the frame of the device may be of simple and light construction since there is no necessity for additional component parts for receiving the rake wheels in the alternate positions.

The frame of the device preferably consists of a main frame member on which the rake wheels are mounted, the frame member being substantially seven-shaped, and the rake wheels being mounted on the leg of the seven in such a way that the part of the frame member on which the rake wheels are mounted lies behind the rake wheels when viewed in the intended direction of travel of the device. Due to this mounting of the rake wheels, the crop cannot come in contact with the frame.

Stops are preferably provided for limiting the extent of movement of the rake wheels about their non-horizontal axes, the stops being provided on the frame. The members carrying the rake wheels are preferably adapted to bear on a first stop when the device is in the first working position and on a second stop when the device is in the second working position. The stops insure that the rake wheels occupy their correct positions either in the first or in the second working position.

The angle between the horizontal and the non-horizontal axis about which the rake wheel can turn is less than 90° so that during conversion of the device from one working position into another, the rake wheel is lifted slightly from the ground so that the conversion can be performed in a simple manner without exerting undue force on the rake wheel.

Figure 2:
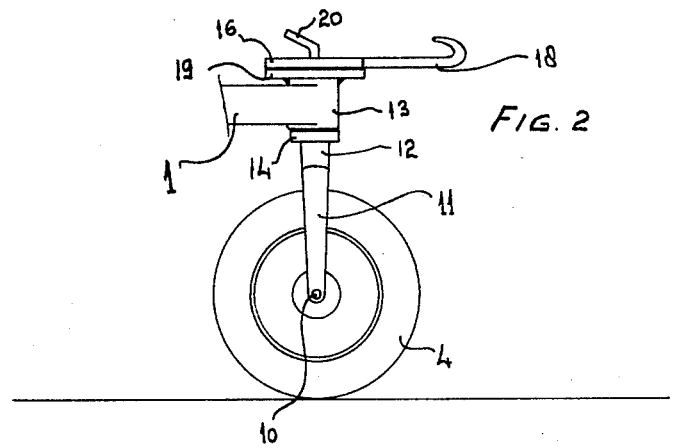
Figure 3:
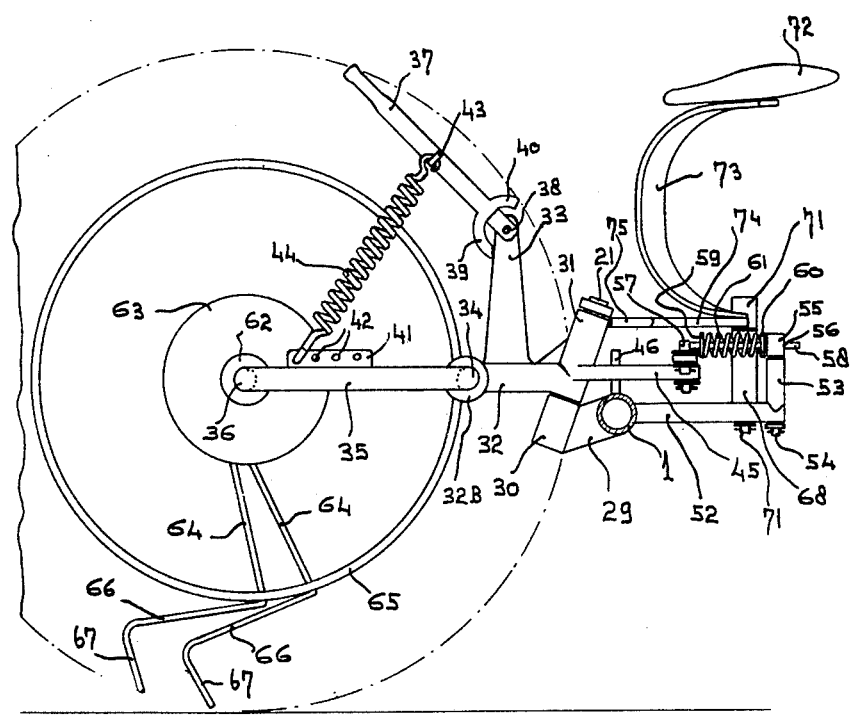

For a better understanding of the invention, and to show how the same may be carried into effect, reference will now be made to the accompanying drawings, in which:

FIG. 1 is a plan view of a device for laterally displacing crop or the like material lying on the ground, the device being shown in a first working position, FIG. 2 is an elevation of part of the device shown in FIG. 1, taken along line II—II of FIG. 1, FIG. 3 is a cross-sectional view taken along line III—III of FIG. 1, and FIG. 4 is a plan view of the device in a second working position.

Referring now to FIGS. 1 to 3 of the drawings, there is shown a device for laterally displacing crop or like material lying on the ground. The device has a mobile frame or main frame member 1 which has substantially the shape of a seven and which is supported by three ground wheels 2, 3 and 4. The ground wheel 3 is rotatable about its horizontal axle 5 which is connected to a vertical shaft 7 by a fork 6, the axle 5, the shaft 7 and the fork 6 being so arranged that the wheel 3 is a caster wheel. The vertical shaft 7 is journalled in a bearing 8 which is secured to the frame member 1 by means of an arm 9.

Referring now in particular to FIG. 2, there is shown the manner in which the ground wheel 4 is fastened to the frame member 1. The ground wheel 4 is rotatable about its horizontal axle 10 which is connected to a vertical shaft 12 by means of a vertical fork 11. The vertical shaft 12 is journalled in a bearing 13 which is formed at one end of the frame member 1, a ring 14 being secured to the shaft 12, the lower end of the bearing 13 contacting the ring 14. The upper end of the shaft 12 is formed with a portion 15 (FIG. 1) of square cross-section, and a disc 16 is mounted on the portion 15, the disc 16 being formed with a plurality of holes 17. The disc 16 is formed integral with a hook 18 by means of which the device can be drawn. A disc 19 is secured to the upper end of the bearing 13, the disc 19 being formed with a plurality of holes arranged to register with the holes 17 formed in the disc 16. A locking pin 20 passes through one of the holes 17 of the disc 16 and through a registering hole in the disc 19, thereby locking the shaft 12 relative to the frame member 1. The ground wheel 2 is secured to the frame member 1 in the same manner as the ground wheel 4, there being a disc (similar to the disc 16) formed integral with a hook 77 by means of which the device can also be drawn.

Oblique shafts or pivot means 21, 22, 23 and 24, the center-lines of which form the non-horizontal axes, are secured to the frame member 1, and rake wheels 25, 26, 27 and 28 are respectively associated with each oblique shaft. The oblique shafts and the rake wheels are so arranged that the part of the frame member 1 on which the rake wheels are mounted (namely the leg of the seven-shaped frame member) lies behind the rake wheels when the device is in the position shown in FIG. 1. The center line of the shafts 21, 22, 23 and 24 respectively and the center lines of the rake wheels 25, 26, 27 and 28 respectively are skew-lines, so that the lines are passing one another without intersecting one another.

Referring now in particular to FIG. 3, there is shown the manner in which the oblique shaft 21 is connected to the frame member 1 and the manner in which the rake wheel 25 is associated with the shaft 21, the shafts 22, 23 and 24 being connected to the frame member 1 in like manner. The shaft 21 is connected to the frame member 1 by a plate 29, the lower end of the shaft 21 being thickened to form a collar 30 to which the plate 29 is connected. A bearing 31, which is rotatable about the shaft 21, is provided with an arm or wheel support 32 and rests on the collar 30. The arm 32 has a bearing 32B in which is journalled the shaft 34 of a crank 35, the other end of the crank 35 constituting an axle 36 about which the rake wheel 25 is rotatable. An arm 33 is secured to the arm 32, and, at the upper end of the arm 33, a lever 37 is mounted for turning about a pivot pin 38. The lever 37 is provided with stops 39 and 40 which are adapted to bear one on each side of the arm 33. A strip 41, which is formed with a series of holes 42, is secured to the crank 35, and a draw spring 44 is secured between one of the holes 42, and an eye 43 provided on the lever 37.

An arm 45 is provided on the bearing 31, and stops 46 and 47 (FIG. 1) are provided on the frame member 1 for limiting movement of the arm 45 about the shaft 21, and thus for limiting movement of the rake wheel 25 about the shaft 21. The rake wheels 26 to 28 are associated with the shafts 22 to 24 in the same manner as the rake wheel 25 is associated with the shaft 21 and stops, similar to stops 46 and 47 are provided on the frame member 1 for limiting the movement of arms 48, 49 and 50, which correspond to the arm 45.

The arms 45, 48, 49 and 50 are inter-connected by a strip 51. An arm 52 (FIG. 3) is secured at one end to the frame member 1 and at the other end is provided with a bearing 53 in which a shaft 54 is rotatable, the shaft 54 carrying at its upper end a bearing 55 in which a hole 56 is formed. A shaft 57 is rotatably mounted at one end of the strip 51, and is provided with an arm 58 which passes freely through the hole 56 in the bearing 55. A ring 59 is rigidly secured to the arm 58 and a spring 61 is disposed between the fixed ring 59 and a ring 60 which is freely movable along the arm 58.

The rake wheels are of the same construction, and, as shown in FIG. 3, each rake wheel comprises a hub 62 on which is carried a disc 63. Spokes 64 are secured to the disc 63 and extend through holes formed in a hoop or rim 65, the spokes being bent outside the rim 65 to form leg portions 66 and tines 67. The spokes 64, the portions 66, and the tines 67 are integral, the spokes 64 passing freely through the holes in the rim 65, so that the spokes 64 constitute, in effect, torsion bars about which the tines 67 can turn.

A vertical bearing 68 is secured to the frame member 1 by means of two arms 69 and 70 (FIG. 1), a shaft 71 being journalled in the bearing 68. A seat 72 is secured to the shaft 71 by a strip 73, and an arm 74, provided with foot rests 75 and 76, is also secured to the shaft 71.

In the operation of the device shown in FIGS. 1 to 3, the device is drawn forward in the direction of the arrow V (FIG. 1) to operate as a side delivery rake. In this working position, the ground wheel 2 is not locked relative to the frame member 1, and acts as a steering wheel, the position of the wheel 2 being determined by the position of the hook or connecting device 77.

The ground wheel 4 is, however, locked with respect to the frame member 1 by means of the locking pin 20. During the operation of the device in the position shown in FIG. 1, the rake wheels 25 to 28 will be rotated by coming into contact with the ground, and will laterally displace crop lying on the ground and deposit the crop at the left-hand side of the rake wheel 25. During forward movement, a horizontal force will be exerted on the rake wheels approximately in the direction of the shafts of the rake wheels, so that a torque will be exerted about the shafts 21 to 24, thus urging the arms 45, 48, 49 and 50 against the stops 46. The springs 61 will also urge the arms 48, 49 and 50 against the stops 46 so that, even when the rake wheels are raised from contact with the ground, they are maintained in their working position.

Referring now to FIG. 4 of the drawings, the device shown in FIGS. 1 to 3 is shown in a second working position. The parts of the device shown in FIG. 4 have the same reference numerals as in FIGS. 1 to 3, but those parts which occupy a different position from the position shown in FIGS. 1 to 3 are differentiated by the suffix A. In the position shown in FIG. 4, the rake wheels have been turned about the oblique shafts 21 to 24 and, owing to the obliquity of these shafts, the rake wheels are disposed in planes which are at an angle to the vertical, so that, when the device is in use, the device has a lifting effect.

In order to convert the device from the position shown in FIG. 1 to that shown in FIG. 4, it is only necessary to remove the locking pin 20 from the discs 16 and 19, and place it in one of the holes formed in the disc associated with the hook 77, thus locking the ground wheel 2 relative to the frame member 1. The device is then moved in the direction of the arrow R, by pulling on the hook 18A, and forces will be exerted on the rake wheels 25A to 28A in such a way that the rake wheels will turn about the shafts 21 to 24 into the positions shown in FIG. 4. The arms 45A, 48A, 49A and 50A will then bear on the stops 47. During the conversion from the position shown in FIG. 1 to the position shown in FIG. 4, the springs such as 61A are compressed while the shaft 57A moves from the position shown in FIG. 1 (where the shaft 57A lies on one side of the line, A—A) to the point where the shaft 57A lies on the line A—A, after which the tension in the spring 61A will urge the arms 45A, 48A, 49A and 50A against the stops such as 47. This assembly thus constitutes an "off-center latch assembly." During the conversion of the device from the working position shown in FIG. 1 to the working position shown in FIG. 4, each of the rake wheels 25A to 28A is raised from contact with the ground, by virtue of turning about the oblique shafts 21 to 24, so that large forces are not required to move the rake wheels into the second working position. During conversion, the seat 72 can be moved to occupy the position 72A by turning the shaft 71 in the bearing 68. If desired, locking means can be provided for locking the seat relative to the bearing 68, such locking means being, for example, similar to the locking means employed to secure the ground wheels 2 and 4 relative to the frame member 1.

In the operation of the device shown in FIG. 4, the device is moved in the direction of the arrow R and operates as a tedder, each rake wheel working a strip of crop independently of the other rake wheels, the crop being left behind as small swaths. Due to their slanting positions, the rake wheels have a lifting effect upon the crop thus providing the advantage that the crop is better exposed to the air by the rake wheels which lift the crop higher and release it later than rake wheels disposed in vertical planes.

In order to bring the device into a transport position when the rake wheels are raised from contact with the ground, the lever 37 is turned about the pivot pin 38 so as to cause the stop 40 to bear on the tag 33. This movement of the lever 37 positions the spring 44 on another side of the line joining the pivot pin 38 and the hole 42 to which the spring 44 is attached, so that the lever 37 will be maintained in position by the action of the spring 44. The turning of the lever 37 about the pivot pin 38 increases the distance between the hole 42 and the eye 43, so that the rake wheel 25 is lifted from contact with the ground.

What we claim is:

1. A raking device comprising a mobile frame, at least one shaft inclined from the horizontal rigidly mounted on said frame, a wheel support pivotally mounted on said shaft within a plane which is perpendicular to the axis of said shaft and a vertically disposed side delivery raking wheel rotatably mounted on said support, said support being adapted to be pivoted about said shaft so that said rake wheel may be moved from said vertical position where it serves as a side delivery rake to an oblique position where it serves as a tedder.

2. A raking device comprising a mobile frame with a first and second mode of operation determining a first and a second direction of travel, pivot means on said frame, a wheel support mounted on said frame by said pivot means, said pivot means defining an axis inclined from the horizontal about which said wheel support is pivotal with respect to said frame within a plane which is perpendicular to said axis, a rake wheel having a center of rotation rotatably mounted on said support, said rake wheel and said support being adapted to be pivoted about said pivot means so that said rake wheel may be moved from a first position corresponding with said first mode of operation to a second position corresponding with said second mode of operation, the center of rotation of the rake wheel in said first position being located in a first vertical plane parallel to said second direction of travel and in said second position being located in a second vertical plane parallel to said first direction of travel, the latter said vertical planes being spaced from said inclined axis.

3. A device as claimed in claim 2, comprising a lever on said wheel support, a crank pivotally supporting said rake wheel on said wheel support, and a spring coupling said crank to said lever and supporting at least a portion of the weight of said rake wheel.

4. A device as claimed in claim 2, wherein said frame has the shape of a seven.

5. A device as claimed in claim 2, comprising an arm on said pivot means, and stops on said frame, said stops being operatively associated wtih said arm to limit pivotal movement of said wheel support.

6. A device as claimed in claim 2, comprising a crank coupling said rake wheel to said wheel support for pivotal movement about a pivot axis, said crank defining for said rake wheel an axis of rotation parallel to said pivot axis.

7. A raking device comprising a mobile frame with a first and second mode of operation determining a first and second direction of travel, pivot means on said frame, wheel supports mounted on said frame by said pivot means, said pivot means defining axes inclined from the horizontal about which said wheel supports are pivotal with respect to said frame, within vertical planes perpendicular to said axes, rake wheels having respective centers of rotation rotatably mounted on respective of said supports, said rake wheels and said supports being adapted to be pivoted about said pivot means so that said rake wheels may be moved from a first position corresponding with said first mode of operation to a second position corresponding with said second mode of operation, the centers of rotation of the rake wheels in said first position being located in a first vertical plane parallel to said second direction of travel and in said second position being located in a second vertical plane parallel to said first direction of travel, the latter said vertical planes being spaced from said upwardly inclined axis, and means operatively associated with said wheel supports to move the same in unison.

References Cited in the file of this patent

UNITED STATES PATENTS

| | | | |
|---|---|---|---|
| 859,967 | McLean | July 16, | 1907 |
| 1,188,690 | Sonntag | June 27, | 1916 |
| 2,680,343 | Enos | June 8, | 1954 |
| 2,689,446 | Sorrels | Sept. 21, | 1954 |
| 2,710,519 | Winter | June 14, | 1955 |

FOREIGN PATENTS

| | | | |
|---|---|---|---|
| 164,973 | Austria | Jan. 10, | 1950 |
| 70,201 | Netherlands | June 16, | 1952 |
| 1,121,996 | France | May 14, | 1956 |
| 314,222 | Switzerland | July 31, | 1956 |